Figure 1:
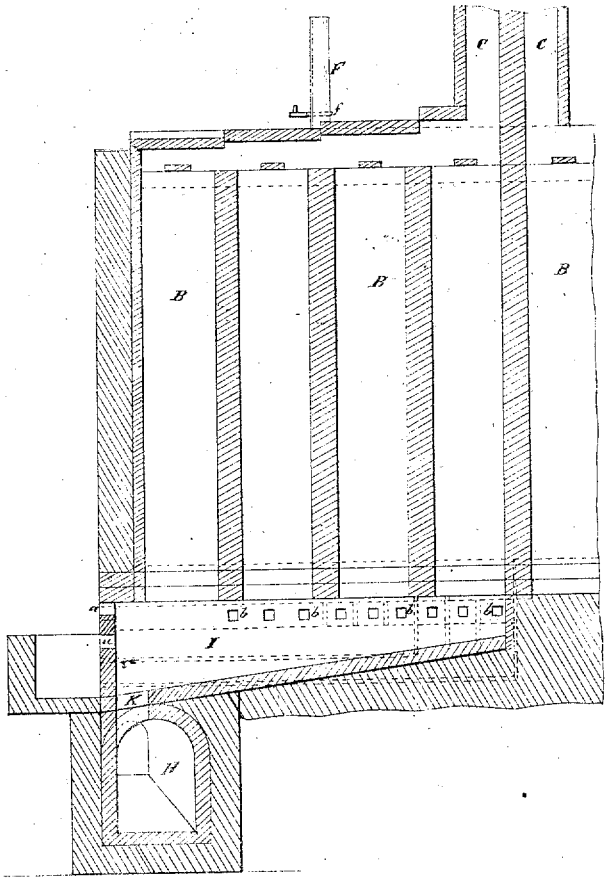

2 Sheets--Sheet 1.

H. ENGELMANN.

Processes of Making Coke from Lignites.

No. 5,486. Reissued July 15, 1873.

witnesses
Ingersoll & Co Chicago
John W. Willcomb

Henry Engelmann,
per James A. Whitney
Atty.

2 Sheets--Sheet 2.

H. ENGELMANN.

Processes of Making Coke from Lignites.

No. 5,486.

Reissued July 15, 1873.

½ Length witnesses
Rogerson Lockwood
John W. Williams

Henry Engelmann
per James H. Whitney
Atty.

UNITED STATES PATENT OFFICE.

HENRY ENGELMANN, OF SALT LAKE CITY, UTAH TERRITORY.

IMPROVEMENT IN PROCESSES OF MAKING COKE FROM LIGNITES, &c.

Specification forming part of Letters Patent No. 136,592, dated March 11, 1873; reissue No. 5,486, dated July 15, 1873; application filed July 7, 1873.

*To all whom it may concern:*

Be it known that I, HENRY ENGELMANN, of Salt Lake City, in the Territory of Utah, at present residing at La Salle, in the county of La Salle, State of Illinois, have invented certain Improvements in Processes of Coking Lignite and similar coal-like materials, of which the following is a specification:

The object of this invention is to provide a process of effectually coking brown-coal, lignite, imperfectly-coking stone-coal, and other coal-like material incapable of being coked in the usual operation of an ordinary coking-oven or retort. It consists in subjecting the material to be coked to an initial and sustained heat above a cherry-red, so termed, laterally applied, derived partly or wholly from a source of heat distinct from the gases evolved by the coking process from the coking substances, and of a degree above the one which can be created in the oven by the combustion of the coking-gases alone. It consists, further, in mixing with the material which is to be coked, in case the application of the high heat, as described above, does not suffice to produce the desired effect, coal-tar or pitch, or certain varieties of bituminous coal, or asphaltum, or analogous substances, before subjecting it to the aforesaid high heat. This heat must be sufficient not only to disengage the gaseous elements of the coal, but also to decompose more or less completely the hydrocarbon evolved from the lignite and from the tar or other admixtures into gases, that may be conducted away, and into carbonaceous matter, that, being distributed through the mass, serves to cement the fragments of lignites or equivalent material together, to form a compact product resembling an ordinary good coke, and capable of use in the same manner as coke made wholly from coking or caking coal; this result being in contradistinction to that shown in the fragmentary and comparatively valueless product obtained by subjecting lignite or like substance to the action of the coking apparatus hitherto in use, and in contradistinction to the small effect obtained by a much larger addition of tar or similar substance to the non-caking coal or lignite in the ordinary coking apparatus than I require in the most difficult cases through the joint application of the high and sustained heat, as described above.

Figure 2:
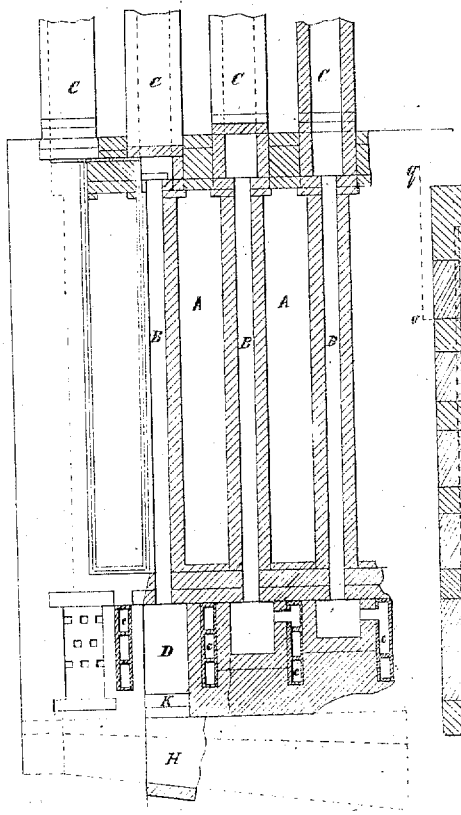
Figure 3:
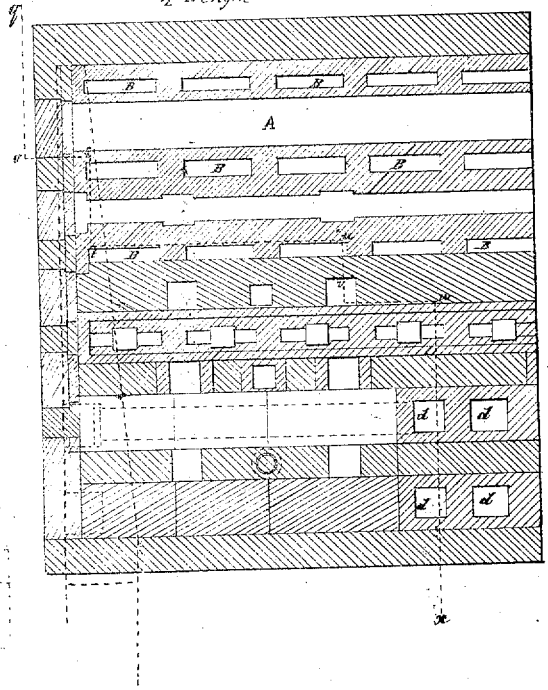

Figure 1 is a vertical longitudinal section of the furnace used in carrying my improved process into practice. Fig. 2 is a transverse section of the same taken in the line *q r s t u w x* of Fig. 3. Fig. 3 is a ground plan of the same.

The furnace being capable of separate use for other purposes, I propose to make it the subject of another and independent application for Letters Patent, and therefore here describe the construction and operation of the same only so far as is essential to a full understanding of my improved process of coking lignite and like substances refractory to common methods of coking.

The furnace comprises a series of coking-ovens, A, arranged side by side, and each having about the proportions of twelve feet in height, eighteen inches in width, and from twenty to thirty feet in length. Provided in the walls between these ovens are vertical flues B, shown in cross-section in Fig. 3. The flues B connect at their upper ends with uptakes or chimneys C, and at bottom with a chamber, D, which connects by a passage, E, with a gas-generating furnace, in which combustible gas is formed by the imperfect combustion of fuel. Air is admitted to the chamber D through openings *a* in the front, through other openings, *b*, in the sides, and through the conduits shown at *c*, these last so arranged that the air in passing through them shall absorb a portion of the heat from the walls of the chamber, and thereby conduce to the durability of the same. The material to be treated is passed into the ovens through openings *d* in the top, provided with removable covers. Each oven has at its top an exit-pipe, F, for the outflow of the gases generated from the material in the process of coking, this exit-pipe furthermore being provided with a slide or valve, *f*, for throttling or stopping such outflow in order to maintain any desired pressure within the oven. The combustible gases introduced from the generator, as hereinbefore set forth, to the chamber D are fired in the latter, and the flame, passing up into the flues B, rapidly heats the ovens to subject the contained material to the high initial and sustained heat, which constitutes the most important part of my process.

Having provided for use a furnace constructed and operating substantially as just described, I prepare the brown-coal, lignite, or other non-bituminous or only slightly-bituminous coal-like material by comminuting the same to a proper degree, and, if it requires an addition of bituminous or asphaltic substances in order to obtain the desired effect, by then intimately mixing with it a suitable quantity of coal-tar or other bituminous or asphaltic substance, at a temperature sufficient to cause a complete mixture and absorption or incorporation of the same by the coal, which thereby becomes, so to speak, bituminized preliminary to the operation of coking. In some cases, where a good coking or rich bituminous coal is available, the tar may be partly or wholly replaced by it, and much smaller quantities of the bituminous coal will then be required than in ordinary coking processes to obtain a good coke from this mixture of non-bituminous and bituminous coal, and to communicate to the non-coking material those properties which, under the conditions involved in the use of the improved furnace, enable the same to be effectually coked. No definite proportions of the several substances can be specified, as these will vary according to the character of the lignite or other substance to be coked.

I distinctly disclaim, as not new, the use of bituminous coal or other bituminous substances as an admixture to less bituminous coals, as a means to enable the same to be coked; but I claim that by the afore-described application of a certain high degree of heat conjointly with the admixture of such bituminous material to the non-caking coal a far less proportion of bituminous coal or other bituminous substance will effect the coking of the not or imperfectly coking coal than would be required in ordinary coking processes, and with a more satisfactory result. When the material is ready, as aforesaid, it is placed in the oven, and is subjected to pressure by compressing-rollers or otherwise, in order to compact it, to diminish its porosity, and to bring its single particles in closer contact with each other, which facilitates their union and increases their cohesion in the subsequent process of coking. The ovens have been heated up before bringing in the charge by sustaining a lively combustion of gases in the chamber D, and the fire is kept up vigorously after the charge is made in the ovens, so as to raise the heat of the ovens, which has been depressed by the cold charge, as rapidly as possible to the required high point, and to sustain it at that point. The volatile portion of the contents of the oven is then disengaged rapidly, and the vapors thus formed are decomposed by the heat of the oven more or less completely into light gases, which pass off through the exit-pipe F, and into carbon, which is deposited in large quantities between and within the fragments of lignite or like material in the oven, and, very much as if the whole mass had softened and partially run together, unites the whole in the form of a consistent and tolerably firm product, not liable to split into fine pieces, as is the case with lignite, &c., treated in the usual way, at ordinary coking temperatures.

It will be seen that by this process the refractory or non-coking coal is first brought approximately to the condition of a bituminous coking coal; then, subjected to a high heat, initial and sustained, it is fluxed together by the deposited carbon, and that the elimination of the volatile matter effectually cokes the mass.

By the means afforded for controlling the heat in the ovens A, (by adjusting the supply of combustible gas in the chamber D,) the heat may be maintained at the requisite high temperature for the period required, and then gradually reduced to enable the coked product to be drawn from the ovens at a comparatively low heat.

By this, my improved method, the time required in coking, as compared with that involved in ordinary coking, is reduced many hours, and the capacity for work of the furnaces of any given size is proportionately increased.

What I claim as my invention is—

1. The process of coking brown-coal, lignite, imperfectly-coking stone-coal, and analogous coal-like material incapable of effective coking by the usual practice with ordinary coking-ovens, by subjecting these substances to a high initial and sustained heat above the cherry-red, so termed, applied laterally throughout the mass, and derived from a source of heat which is partly or wholly distinct from the combustible gases evolved by the coking process itself, and of a degree above the one created in the ordinary coking-furnaces by the combustion of the coking-gases, substantially as herein set forth.

2. The facilitating of the process of coking of the materials named in claim 1 by mingling the same, if necessary, with coal-tar, asphaltum, or analogous substances, or with bituminous coking-coal, or with coking-coal and coal-tar or asphaltum, &c., together, before subjecting the whole to the high and sustained heat of the coking-oven, substantially as set forth.

3. The process herein described of compacting by mechanical pressure the material to be coked after its introduction into the coking-oven, for the purpose specified.

HENRY ENGELMANN.

Witnesses:
ERNEST HERREKY,
EDM. SCHUELER.